Feb. 22, 1966 TAKUMA YAMAMOTO ETAL 3,236,951

CHANNEL CHANGING EQUIPMENT FOR TIME-DIVISION MULTIPLEX COMMUNICATION

Filed May 8, 1961

6 Sheets-Sheet 3

Feb. 22, 1966 TAKUMA YAMAMOTO ETAL 3,236,951

CHANNEL CHANGING EQUIPMENT FOR TIME-DIVISION MULTIPLEX COMMUNICATION

Filed May 8, 1961

6 Sheets-Sheet 6

3,236,951

CHANNEL CHANGING EQUIPMENT FOR TIME-DIVISION MULTIPLEX COMMUNICATION

Takuma Yamamoto, Tokyo, and Ryosaku Shimada, Kawasaki-shi, Japan, assignors to Fuji Tsushinki Seizo Kabushiki Kaisha, Kawasaki, Japan, a corporation of Japan Filed May 8, 1961, Ser. No. 108,427
Claims priority, application Japan, May 9, 1960, 35/23,852
4 Claims. (Cl. 179—15)

Our invention relates to time-division multiplex communication systems and more particularly to channel rearranging equipment for use in inter-offices or tandem stations of such systems.

It is an object of our invention to improve the economy and efficiency of time-division multiplex systems by affording for a given number of inter-office trunk lines a greater possibility of through-connections than heretofore available.

To this end, and in accordance with our invention, we provide the channel distributing equipment in the inter-offices of a time-division multiplex system with two time delay lines, each having a number of intermediate taps corresponding to respectively different delay intervals, the first delay line having a signal-input end, and the second delay line having a signal-output end. We further provide a matrix of connector means which are connected to each tap of the first delay line and are selectively connectable, one at a time, to each of the respective taps of the second delay line. The equipment further comprises a memory device for storing information corresponding to the difference between the time position of each channel at the input and the time position to be occupied at the output, the memory device being connected to the connector means for selectively controlling them in dependence upon the stored intelligence.

The foregoing and more specific objects, advantages and features of our invention, said features being set forth with particularity in the claims annexed hereto, will be described in the following with reference to the drawings, in which:

FIG. 3(*a*) is a circuit diagram showing an example of switches used in FIGS. 3 and 6.

Figure 6:
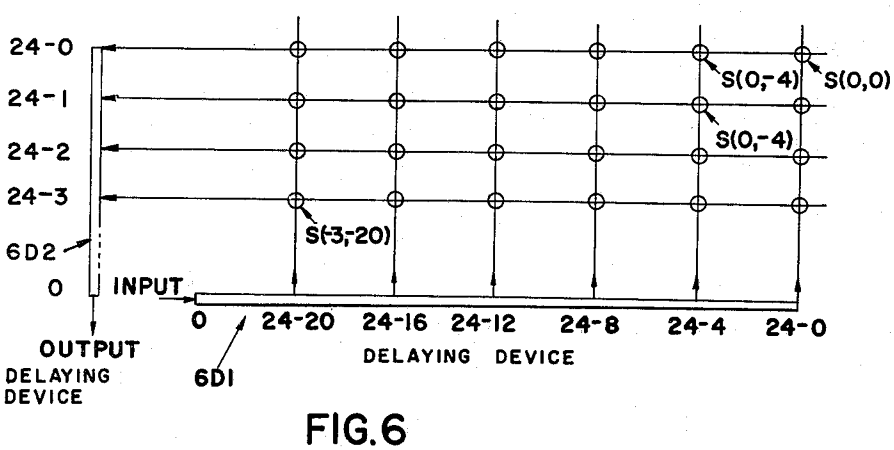
Figure 3A:
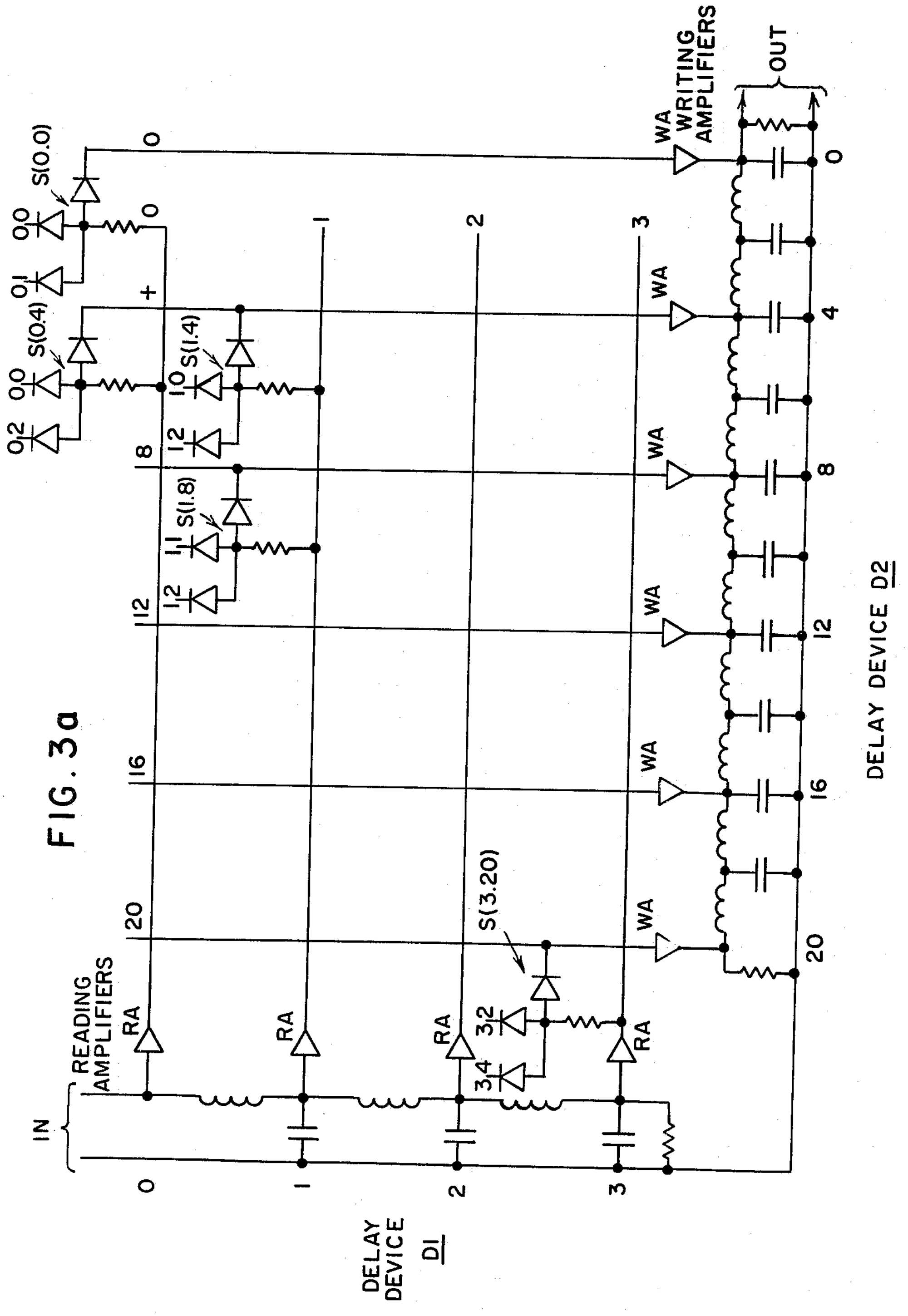
Figure 4:
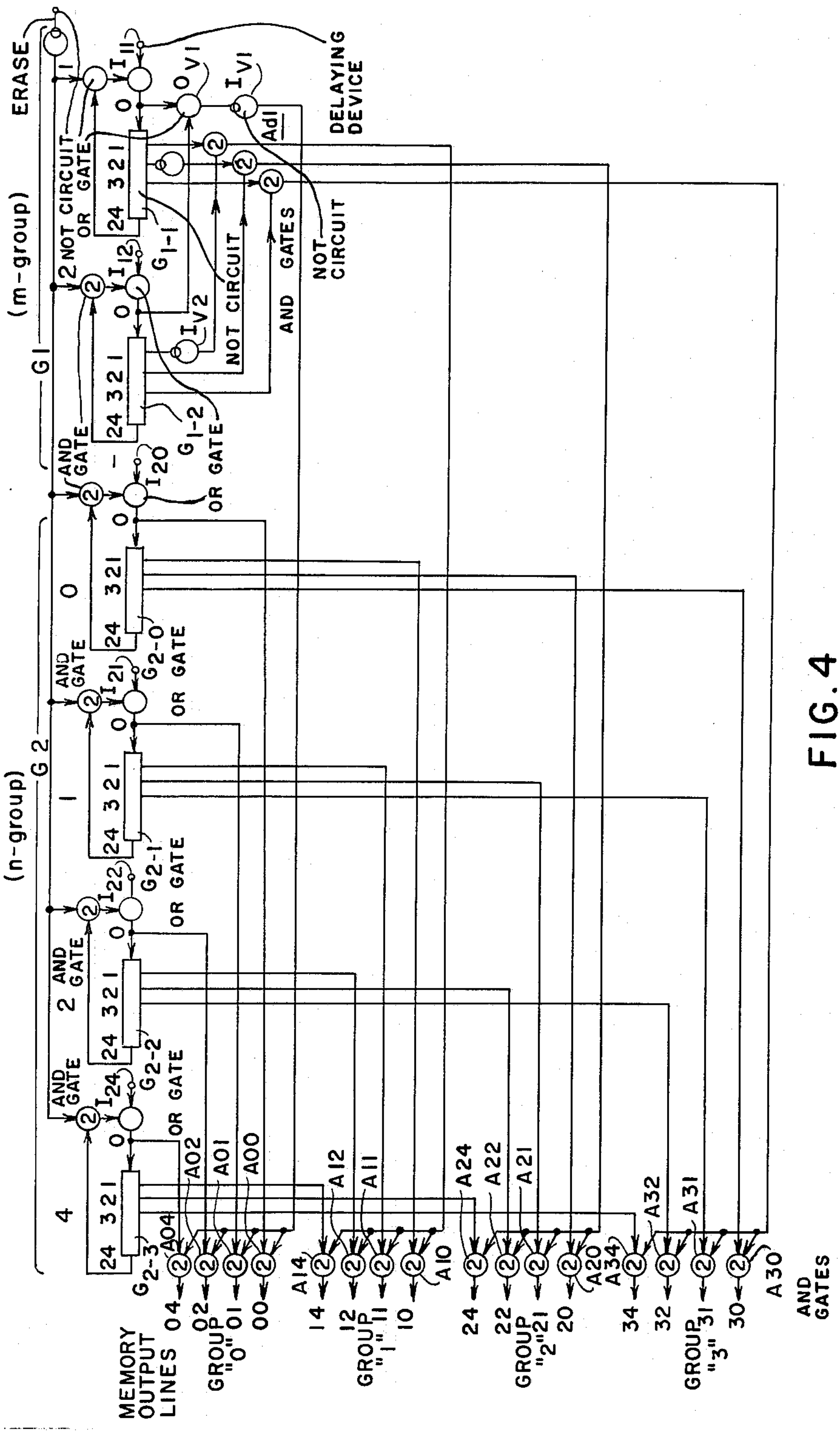
FIG. 4 is a circuit diagram of data-storing devices for controlling the channel changing equipment of FIG. 3 and FIG. 6.
Figure 5A:
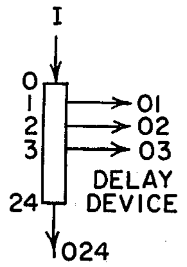
Figure 5B:
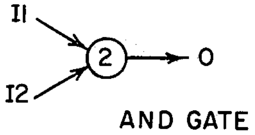
Figure 5C:
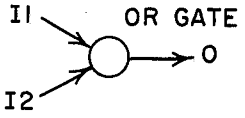
Figure 5D:
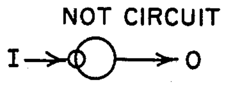
Figure 5A:
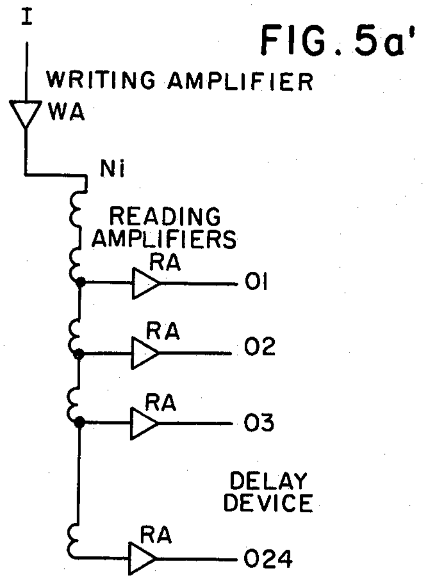
Figure 5B:
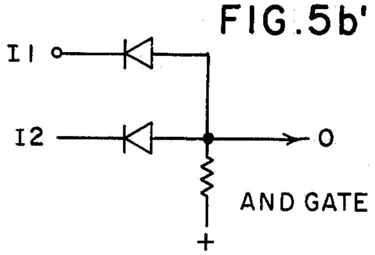
Figure 5C:
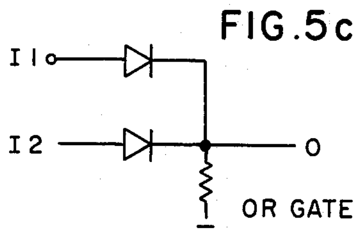
Figure 5D:
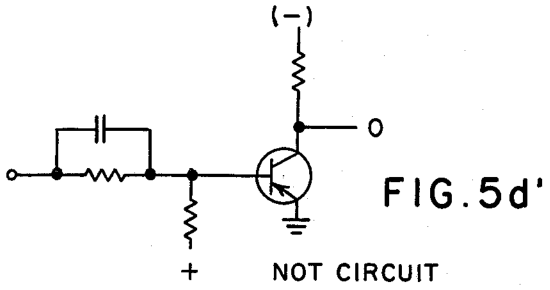

FIGS. 5(*a*) and 5(*a'*) are explanatory diagrams showing the symbol used and a sample circuit respectively for the delay line in FIGS 4 and 6; FIGS. 5(*b*) and 5(*b'*) are explanatory diagrams showing the symbol used and a sample circuit respectively for an AND circuit in FIGS. 4 and 6; FIGS. 5(*c*) and 5(*c'*) are explanatory diagrams showing the symbol used and a sample circuit respectively for an OR circuit in FIGS. 4 and 6; FIGS. 5(*d*) and 5(*d'*) are explanatory diagrams showing the symbol used and a sample circuit respectively for a NOT circuit in FIGS. 4 and 6.

Figure 3:
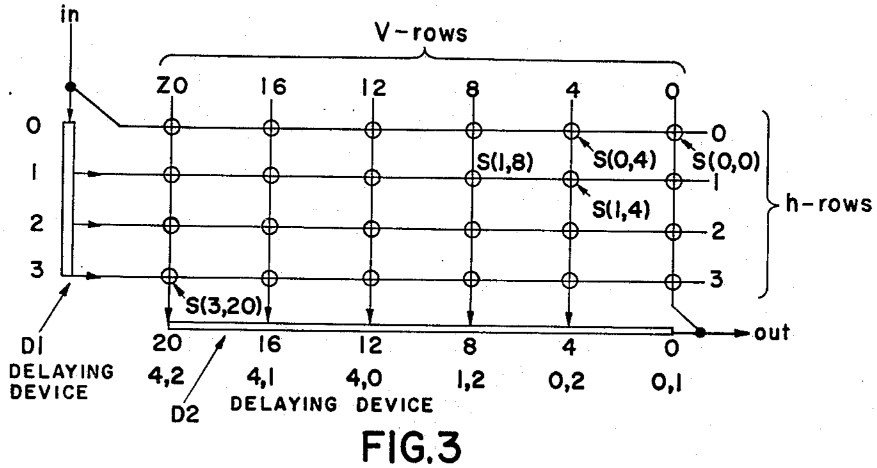
FIG. 3 is an embodiment of a circuit diagram of channel rearranging equipment according to the invention for transmission from a calling party to a called party; that is a transmitting station to a receiving station.

FIG. 6 is an embodiment of a circuit diagram of channel changing equipment applicable in conjunction with that shown in FIG. 3, for signal transmission from the called party to the calling party.

Figure 7:
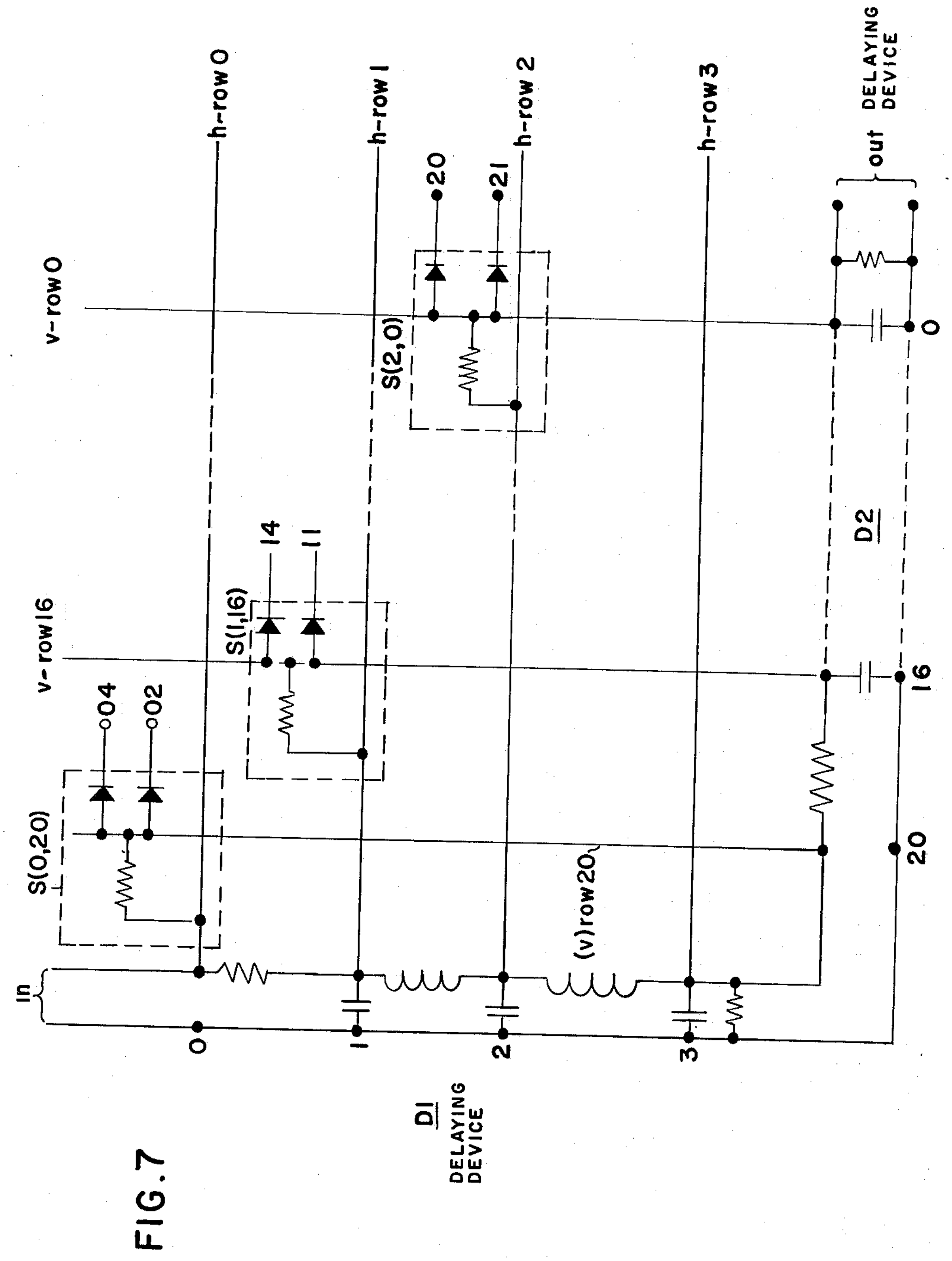

FIG. 7 shows part of the equipment according to FIG. 3 in detail.

Figure 8:
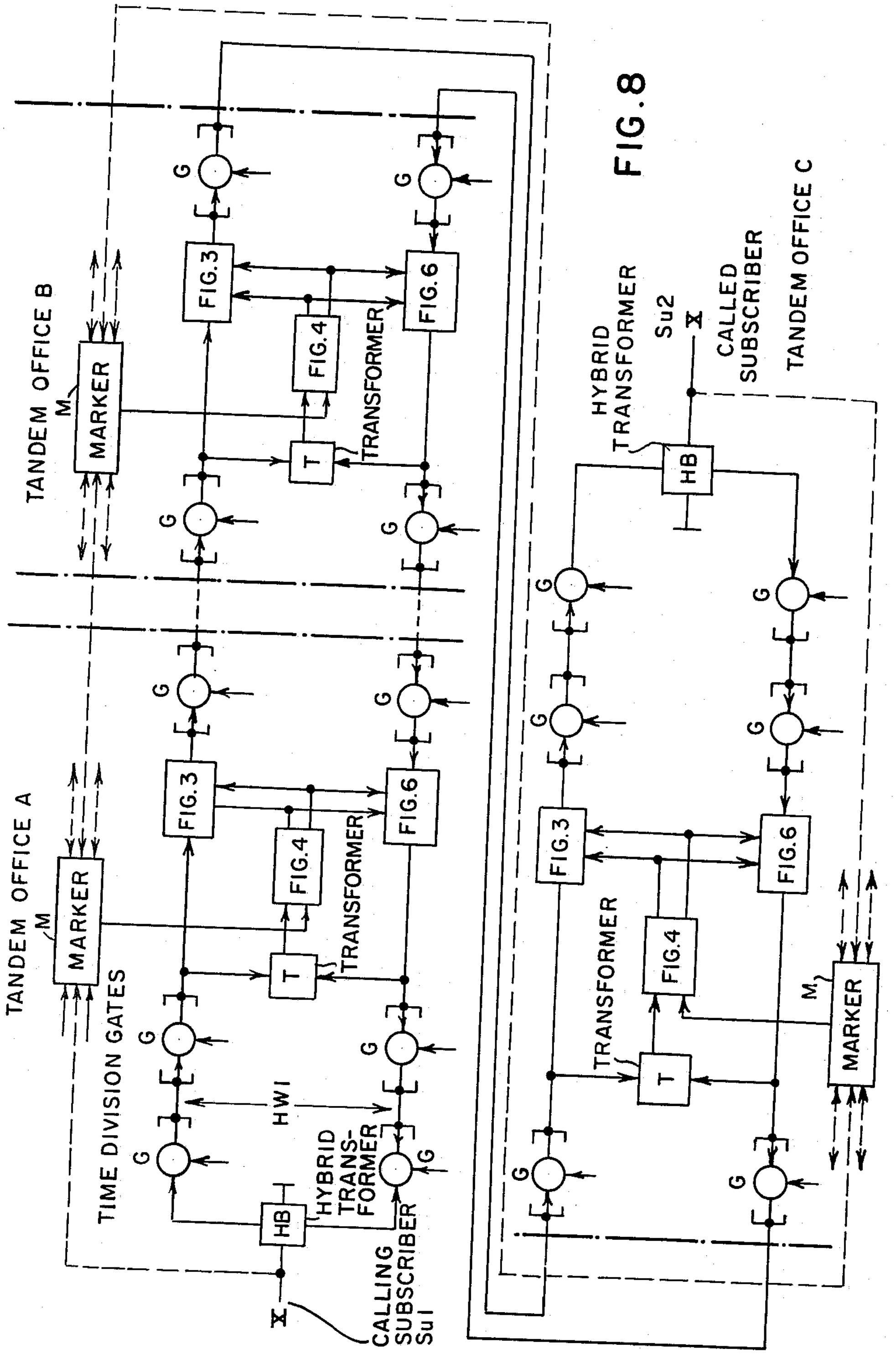

FIG. 8 is a block diagram of an embodiment of a network utilizing the features and equipment of the present invention.

In time-division multiplexing, a number of messages are propagated over a common transmitting medium by allocating different time intervals in sequence to the transmission of the respective messages. For example, if a signal contains frequencies up to a certain frequency, $f$, as for example speech which contains essential frequencies up to about 5000 c.p.s., a set of samples of this signal, taken at least $2f$ times per second, will adequately represent the signal. If there are a total number of "$n$" signals to be sent over the same communication line, the first signal is sampled briefly, then the second, and so on, up to the $n$th, whereafter the sampling is repeated. At the receiving end, the $n$ samples contained in the composite signals are separated and directed into $n$ output lines. These operations are performed by synchronous switching in the first tandem office receiving the signal and in the last office issuing the signal to the ultimate receiver.

Figure 1:
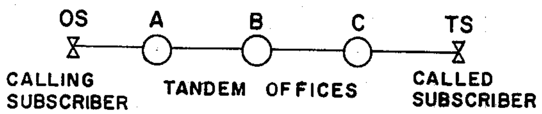
FIG. 1 is an explanatory, schematic diagram of a time-division multiplex communication system.

In the schematic diagram of FIG. 1, OS denotes a calling subscriber and TS the called subscriber. A, B and C indicate respective tandem offices which are connected with each other by time-division multiplex trunk lines. Generally, when OS originates a call for connection with TS, a connection is made in station A by a channel (or time slot) which is free both in the group to which the calling subscriber OS belongs and in the group of the trunk lines extending from station A to station B. This free channel will hereinafter be called the P channel. Communication from subscriber OS reaches the tandem office B through the P channel.

In the tandem station B, as in station A, the incoming line and an outgoing line are to be connected with each other by a channel. However, the selection in station B is more limited than in station A because the channel at the incoming side of tandem station B is constituted by the P channel already fixed by the station A. The station B therefore only selects, from among the trunk lines leading to the station C, the one line group in which the corresponding P channel, i.e. the "time slot" synchronous with P, is still free. The same operation takes place in the station C. It will be realized that the connecting possibilities, i.e. the possibility of finding in a subsequent station an outgoing group of trunk lines in which the particular channel already chosen in the preceding station, is still free, decreases along the path of propagation. Let W be the probability of a channel being available for use. Then, for example, if there is only one group of outgoing inter-office lines the probability of having in station B a connection available to tandem office C is of the order of $1-W$. If the inter-office connection has a high time-division multiplex degree and is used with high efficiency, W may amount to 0.5 or 0.8. Therefore, the above-mentioned connecting method is not practical and becomes increasingly inefficient with an increased number of successive tandem stations.

Such impairment of efficiency can be eliminated if each tandem station is given the possibility of freely selecting its own outlet channel (time slot) for any incoming channel. This would mean, for example, that if station A selects the P channel, the tandem station B can freely select the Q channel, and tandem office C can freely select the R channel. If these channels are connected with one another, a multi-stage connection can be made at greatest possible channelling efficiency. The channel changing equipment according to our invention serves this purpose. It operates in such a manner that the channels, which appear at the incoming side of a tandem station one after another in a certain order, are transmitted to the outgoing line as channels rearranged in a desired different order.

Figure 2:
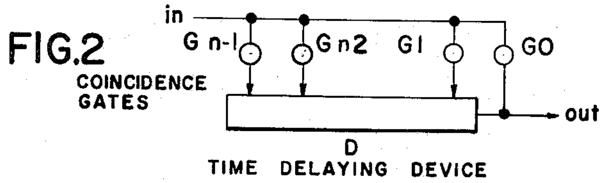
FIG. 2 is an explanatory, schematic diagram of channel changing equipment.

This will be further explained with reference to the diagram of channel changing equipment shown in FIG. 2. The incoming line is denoted by "in" and the outgoing line by "out." D denotes a time delaying device with $n-1$ taps. This delaying device may consist of a time delay chain, a time delay cable, an ultrasonic delay line, and any other suitable time delay line known for such purposes. The delaying device receives the input signals from the "in" line at its respective taps through respective coincidence gates $G_0$, $G_1$ . . . $G_{n-1}$. Each interval or spacing between the taps in the delaying device is so selected as to correspond to the time spacing between two subsequent channels. That is, if a single message-sampling sequence comprises a given number of sample pulses (channels or time slots), then the spacing of the taps, i.e. the time delay elapsing in the delay line between two consecutive taps, corresponds to the time division of the multiplexed signal.

The illustrated equipment permits rearranging of a total number of $n$ channels. For instance if, at a moment under observation, the P channel appeared in the input line and it is desired to have this channel assume in the "out" line a time position delayed by $n-1$ channels, the gate $G_{n-1}$ opens at the moment at which the P channel is received. The signal will then appear in the "out" line with a time delay corresponding to $n-1$ channels, the gate $G_{n-1}$ opens at the moment at which the P channel is received. The signal will then appear in the "out" line with a time delay corresponding to $n-1$ channels away from the input. Analogously, if the channel $P+1$ is supposed to assume in the "out" line a time position without any delay, the gate $G_0$ opens at the moment at which the $P+1$ channel is received, and the input signal will then appear in the "out" line as it was received. In this case, the delaying device requires a number of taps smaller by one than the number of channels. If a large number of channels are to be rearranged, the necessary large number of taps and coincidence gates required for such rearranging equipment unfavorably affects the economy of the multiplex system.

It is therefore a more specific object of our invention to afford a considerable increase in the economy and efficiency of the electric circuitry and its components in cases where a large number of channels are involved. To this end, and as mentioned above, the delaying device in rearranging equipment according to the invention is divided into two sets. This is done in the manner explained presently.

Assume that the communication system has $n$ time-division multiplex channels. Also assume that in a repeater or tandem station there apepars an input signal, at a moment under observation, in the P channel of the incoming line as mentioned above, and that in the output trunk line, to be connected with the input line, the Q channel is free at this moment. In other words, it is necessary to interconnect the P channel of the "in" line with the Q channel of the "out" line which differs from the P channel in point of time. If this difference were not involved, a through connection could be made directly. Due to the time difference between channels P and Q, however, the connection can be made only by delaying the signal as it passes from channel P through the delaying device to channel Q. The device according to the invention affords making such a channel-changing connection by means of the two matrix-interconnected delaying devices shown in FIG. 3 (and FIG. 7).

The first delaying device $D_1$ according to FIG. 3 is subdivided by taps to cause a delay of 0, 1, 2 or 3 channels. The second delaying device $D_2$ is subdivided by taps to cause a delay of 0, 4, 8, 12 ,16 or 20 channels respectively. The total number of channels available in this example is 24. It will be understood, however, that the total number of channels as well as the number of channels assigned to each of the delaying devices and consequently the number of taps between the input and output of the entire delaying device may be modified in accordance with the requirements of each particular application. In FIG. 3 the time-division multiplex input is received through the "in" line and is issued to the "out" line with a time delay corresponding to a suitable, freely chosen number of channels. That is, the input signal is delayed by the first delaying device $D_1$ an amount of time corresponding to 0, 1, 2 or 3 channels. The delayed signal then passes through a freely selected gate switch S(0, 0), S(0, 4) . . . S(3, 20), through which the signal passes to a tap of the second delay device $D_2$ to be issued to the "out" line after being delayed in the second delay line $D_2$ an amount of time corresponding to 0, 4, 8, 12, 16 or 20 channels.

For example, consider a case where a nine-channel delay is required for connecting the P channel of the "in" line with the Q channel of the "out" line. In the embodiment of FIG. 3, the nine-channel delay is divided into a one-channel delay and an eight-channel delay. The delaying device $D_1$ causes the one-channel delay. The signal then passes through the switch S(1, 8) to the tap "8" of the delay device $D_2$ which causes the eight-channel delay, thus producing a nine-channel delay total and connecting the P channel in the input line with the Q channel of the output line. In the case just described, the signal should pass only through the switch S(1, 8) but is not permitted to pass through other switches at the same time. The control of these switches will be more fully described below with reference to FIG. 4.

Generally, the foregoing example may be expressed by stating that the input signal of channel P is transferred to channel Q of the output line by a time delay of $m+n$. In the example given in FIG. 3, the value of $m$ is either 0, 1, 2 or 3, and the value of $n$ is either 0, 4, 8, 12, 16 or 20. Since the total number of channels is 24, the two devices permit obtaining any of 0, 1, 2 . . . 23-channel delays to afford any possibility of through connection. It will be understood that all numerical values given in this specification are mentioned by way of example and explanation only, and are not critical to the invention.

In the case of an $m+n$ channel delay, the signal enters the second delaying device $D_2$ through the switch $S(m, n)$ after having passed through an $m$-channel delay in the first delaying device $D_1$, and then passes through the second delaying device $D_2$ with an $n$-channel delay before reaching the output line.

The signal which is to be delayed by $m$ channels in the first delaying device $D_1$ must pass through one of the switches on the $m$th horizontal row ($h$-row) of the illustrated matrix, namely through one of the switches S($m$, 0) S($m$, 1) . . . S($m$, $n$). That is, these switches must be so controlled as to pass only a signal that is to be delayed a length of time corresponding to $m$ channels from the receiving moment of the input signal. Generally, the switches in the $n$th vertical row or column ($v$-row) of the matrix, namely switches S(0, $n$), S(1, $n$), . . . S($m$, $n$), must be so controlled as to pass only those signals that are to be given an $n$-channel delay in the second delaying device $D_2$.

Such control of the switches is effected by a delay-line memory device such as the one shown in FIG. 4. Memory devices of this kind are known as such and their particular design does not form part of the present invention. The length of time delay in the memory device is equivalent to the total time of all channels in the time-division multiplex transmission system. That is, the capacity of the memory is equivalent to the total number of channels.

The delay-line memory may comprise two delay-line groups, for example. The first group serves for storing the $h$-row in which the particular switch to be closed is located. The second group serves for storing the $v$-row or column in which the particular switch to be closed is located. Generally, for instance, the first delay-line group in the memory controls the *h*-row switches and the second group controls the *v*-row switches.

FIG. 3(*a*) is an example of channel rearranging equipment corresponding to FIG. 3.

In this example, delay devices $D_1$ and $D_2$ of FIG. 3 are made of L–C delay lines. Of all the switches S(0, 0) . . . S(3, 20) existing at the points of intersection of horizontal and vertical rows, only S(0, 0), S(0, 4), S(1, 4), S(1, 8) and S(3, 20) are shown. Considering switch S(0, 0), for example, when positive pulses arrive at terminals 01 and 00 from the control memory, this switch permits the transfer of signals from level 0 to row 0. In the figure, RA indicates the reading amplifier, and WA the writing amplifier.

FIG. 4 illustrates an example of a memory device of the kind just mentioned, and FIG. 5 serves to explain the symbols used in FIG. 4. FIG. 5(*a*) is the symbol for the delay device. Besides the delay device using L and C as shown in FIG. 3(*a*), the magnetic distortion or magnetostrictive delay device as shown in FIG. 5(*a'*) may also be used. In this device, Ni is the nickel wire, WA is a writing amplifier, and RA are reading amplifiers. FIG. 5(*b*) shows the symbol for the AND circuit, and (*b'*) shows an example of an AND circuit. When positive pulses are applied to $I_1$ and $I_2$ simultaneously, a pulse is created at output terminal O.

FIG. 5(*c*) is the symbol for the OR circuit, and an example of the OR circuit is shown in (*c'*). When either $I_1$ or $I_2$ receives one positive pulse, a pulse is created at output terminal O. FIG. 5(*d*) shows the symbol for the NOT circuit, and (*d'*) shows an example of the NOT circuit. When a negative pulse is applied to input terminal I, a negative pulse is produced at output terminal O. When a positive pulse is applied, on the other hand, a negative pulse is produced at the output. The memory device of FIG. 4 is designed for controlling the switches in the channel rearranging equipment according to FIG. 3, it being understood that the memory output lines 04, 02, 01, 00 and 14, 12, 11, 10 and 24, 22, 21, 20 and 34, 32, 31, 30 (FIG. 4) are connected to the control terminals of the S-switches, of which each operates as an AND gate, as will be more fully explained below.

The memory device according to FIG. 4 comprises two groups of delay lines $G_1$ and $G_2$. The group $G_1$ comprises two individual delay lines $G_{1-1}$ and $G_{\ 1-2}$. The second group $G_2$ comprises four delay lines $G_{2-0}$, $G_{2-1}$, $G_{2-2}$, $G_{2-3}$. Each delay line has a signal input terminal $I_{11}$, $I_{12}$, $I_{20}$, $I_{21}$, $I_{22}$, $I_{24}$ respectively.

The terminals $I_{11}$ etc. are connected to the (non-illustrated) scanner which samples the signals coming from the various subscribers (OS in FIG. 1) so that the memory of FIG. 4 is synchronized with the time-division multiplexed signals that arrive in the "in" line of delay device $D_1$ in FIG. 3.

In FIG. 4, group I, the *m* group of delay lines includes OR circuits shown by circles, NOT circuits shown by two interlinked circles, and AND circuits shown by a circle embracing the numeral 2. Arrows indicate appropriate inputs and outputs. The circuits are arranged so that the memory output lines 00, 01, 02, 04, receive output signals at their respective AND gates A00, A01, A02, A04 only when neither $G_{1-1}$ or $G_{1-2}$ receive signals from $I_{1-2}$ and $I_{1-1}$. The AND gates A10, A11, A12, A14 corresponding to memory output lines 10, 11, 12, 14, receive signals from delay lines $G_{1-1}$ and $G_{1-2}$ only if delay line $G_{1-1}$ receives a signal from $I_{1-1}$ while no signal is received by delay line $G_{1-2}$ from $I_{1-2}$. The AND gates A20, A21, A22, A24 corresponding to output lines 20, 21, 22, 24 receive one of their input signals only if line $G_{1-2}$ receives a signal from $I_{1-2}$ but line $G_{1-1}$ receives no signal from $I_{1-1}$. Similarly, the AND gates A30, A31, A32, A34 corresponding to memory output lines 30, 31, 32, 34, receive signals only when both $I_{1-1}$ and $I_{1-2}$ energize both lines $G_{1-1}$ and $G_{1-2}$.

Thus, where an output signal passes from point 0 of line $G_{1-1}$ in the first group to the OR circuit $O_{v1}$ the signal is quashed by the NOT circuit $I_{v1}$. No signal, therefore, passes to output line group 00, 01, 02, 04 during this no-delay 0-time condition. Similarly, outputs obtained only from $G_{1-1}$ at points 2 and 3 of lines $G_{1-1}$ or $G_{1-2}$ do not permit pulses to pass the transmission signal. Because of the NOT gate $I_{v2}$ the output from point 1 of line $G_{1-1}$, when signals are supplied only by $I_{1-1}$, passes through AND gate *Ad*1 and sets the AND gates corresponding to memory output lines 10, 11, 12 and 14 to one of the conditions required for producing an output.

The two delay-line memory of the first group $G_1$ stores the *h*-rows of the switch matrix in FIG. 3 in a binary code. The four delay-line memory of the second group $G_2$ stores the *v*-rows of the switch matrix in FIG. 3 in a "2 out of 4" code. It will be understood that the invention is not limited to this particular type of coding and that the memory device can be given any other desired coding, or that the *m*-row and *n*-row memories can be stored in memory devices of different types. For example, the *m*-row information and the *n*-row information may also be stored serially in one and the same memory group. However, for use with a channel rearranged device as exemplified in FIG. 3, it is particularly simple and economical to store the *m*-row information in a "1 out of 4" code and the *n*-row information in a "2 out of 4" code.

In the example of the memory device shown in FIG. 4, if the P channel on the input line is connected with Q channel on the output line (FIGS. 3, 7) with an intermediate delay of $m+n$ channels, then in general *m* is marked on the *h*-row memory $G_1$ of the first group, and *n* is marked on the *v*-row memory $G_2$ of the second group, at the P channel. The output leads of delay group $G_1$, connected to the taps of the delay lines $G_{1-1}$ and $G_{1-2}$ furnish information to the gates of each of the output-line groups "0," "1," "2," and "3" at a time which, in the case of a channel marked *m*, is *m* channels behind the marked channel, for example the P channel. As mentioned, the *v*-row memory of the second group $G_2$ stores the information *n* and supplies it through its tap leads to each of the gates of the same groups of memory output lines. The output signals available in the output-line groups of the memory device (FIG. 4), depending upon their signs or polarities, control the switches in the *h*-row and in the *v*-row in FIG. 3 so as to let a transmission signal pass. In this example, since the *h*-row storage in the first group $G_1$ is in the binary code, and the *v*-row storage in group $G_2$ is in a "2 out of 4" code, the controlling signal of each output-line group is exclusively in a "2 out of 4" code.

Any of the 24 switches shown in FIG. 3 (see also FIG. 7) is designed for control by two controlling lines so as to pass the transmission signal only when controlling signals are being simultaneously received by both control lines. Generally the output of the output line group "0" (FIG. 4), namely in lines 00, 01, 02 and 04, controls the switches S(0, 0), S(0, 4) . . . S(0, 20) in the *h*-row 0 in FIG. 3. Generally the output in the output line group "1," namely in lines 10, 11, 12 and 14 in FIG. 4, controls the switches S(1, 0), S(1, 4) . . . S(1, 20) in the *h*-row 1 in FIG. 3. Analogously the output in group "2" of the memory output lines controls the switches S(2, 0), S(2, 4) . . . S(2, 20) in the *h*-row 2 in FIG. 3, the output of the memory line group "3" controls the switches in *h*-row 3 in FIG. 3.

A switch in the *v*-row 0 (FIG. 3) will close only when an output is provided in one of the lines 0 and 1 in each output-line group. A switch in the *v*-row 4 in FIG. 3 will close when an output is provided in lines 0 and 2 in each output-line group. A switch in *v*-row 8 in FIG. 3 will close when an output is applied to the lines 1 and 2 of each memory line group. A switch in $v$-row 12 of FIG. 3 will close when a signal appears in lines 4 and 0 of each memory line group. A switch in $v$-row 16 is closed when the signal appears in lines 4 and 1 of each group; and a switch in $v$-row 20 in FIG. 3 is closed when a signal appears in lines 4 and 2 of each memory line group.

In FIG. 7 some of the switches are shown as AND gates which have one terminal connected to the appertaining $h$-row coming from the delay device $D_1$, and which have two additional terminals connected to respective two memory lines of the device according to FIG. 4, these memory lines being designated by the same numbers as applied to these lines in FIG. 4.

In cases where the transmission signal is, for example, a coded digital signal, a three-terminal logical AND circuit is sufficient for each switch in FIG. 3 thus controlled. This switch is essentially a transmission gate particularly in cases where the transmission signal is a PAM (pulse amplitude modulation) signal. Diode or transistor AND gates can be employed, as well as any other known logic AND circuits. If for example $m=1$ and $n=8$ in this case line memory $G_{1K}$ of the first group receives a binary 1. That is, in FIG. 4, the control signal from terminal $I_{11}$ passes only to $G_{1-1}$. Also row memory $G_2$ of the second group receives a "3" signal by 2 out of 4 code. That is to say, only $G_{2-1}$ and $G_{2-2}$ receive control signals from $I_{20}$ and $I_{22}$.

For a 9 channel delay, $m=1$ and $n=8$. The delay group $G_1$ as previously stated delays the memory pulse one channel and provides a signal at AND circuits A10 to A14. If, at the time the signal $I_{1-1}$ was applied to line $G_{1-1}$, a two-out-of-four coded signal corresponding to 8 were applied to lines $G_{2-1}$ and $G_{2-2}$, after a one channel delay corresponding to the one channel delay in the lines in group $G_1$, a second signal would be supplied to the AND circuits A11 and A12. The switch S(1, 8) in the number 1-$h$ row and 8-$v$ row in FIG. 3 then transfers the transmitted signal in line $D_1$ at joint 1, corresponding to one delay channel behind the start of the 24 channel cycle, through delay line $D_2$ for a delay of 8 channels. In this way, the P channel of the input passes to the Q channel of the output with a 9 channel automatic delay. All channels of the input and all channels of the output may be thus selectively connected with each other by variation of the coding in the memory circuit of FIG. 4.

The above arrangement permits the particular signal channels which occupy particular time positions imparted to them by the incoming calling party, to be shifted to another position corresponding to that of the outgoing called party. Thus, the arrangement provides means for shifting in one direction between channels which generally differ from each other in time phase position.

In the case of telephone exchange and transmission, it is necessary that signals from the called party in the "out line" a channel be shifted to the channel of the calling party in the "in line" P channel in any one tandem office. When the P channel of the calling party connects to the Q channel of the called party, for example, it is not only necessary that the calling party be able to talk to the called party but that the receiving party be able to return signals.

This can be accomplished according to other features of the invention by delaying signals in the Q channel the complementary time period required to delay the P channel signals. Assuming that 24 channels exist and that connection of the P channel to the Q channel requires an $m+n$ channel delay, the delay required for connection of the Q channel with the P channel is $$K24-(m+n)$$

where $K=0, 1, 2 \ldots$.

Such a delay connects the Q channel "out line" from the tandem office to the P channel "in line" and permits the called party to signal the calling party.

It is, of course, possible to provide the Q channel with a memory and delay device corresponding to that of the P channel. This method is uneconomical because a second memory unit must be provided.

According to a feature of the invention, the memory of FIG. 4 simultaneously controls the delay for both the P and Q channels, that is for the calling and called parties. The following explains the means to accomplish this result. A value of 2 for the letter K permits the delay in transmission from the called party to the calling party to equal $(24-m)+(24-n)$. This feature of the invention utilizes a second matrix having two delay lines. The first delay line in this second matrix causes a $24-n$ channel delay. The second delay line causes a $24-m$ delay. One of 24 switches $S(-m, -n)$, connects the taps between the first and second delay lines and passes the signal from one delay line to another and generally from the called party to the calling party. The switch operates at a time $m$ channels behind the P channel of the transmitting party. This is possible because the Q channel of the receiving party is $m+n$ channels behind the P channel of the transmitting party with which it is connected. Thus, in the first delay line in the channel rearranging device of the tandem office the signal from the Q-channel called party reaches the switch $S(-m, -n)$ with a $(24-n)$ channel delay. Viewed from the P channel of the calling party, this point of time is $$m+n+(24-n)=24+m$$

channels behind the P channel. This point of time cyclically coincides with the time point at which the switch $S(m, n)$ passes the signal in the channel rearranging device of FIG. 3 of the P channel from the $h$-rows to the $v$-rows and $m$-channel delay. In the above example where transmission occurs on a time division multiplex basis and where 24 channels exist, the aforesaid coincidence is self-evident although there may be differences owing to the number of channels.

The above-described circuit is shown in FIG. 6. FIG. 6 illustrates the channel rearranging device in a tandem office for changing the Q channel of the called party to the P channel of the calling party. The circuit in FIG. 6 is a delay line matrix having symbols corresponding to those of FIG. 3 and again represents a channel inverse rearranging device in which the total number of channels is 24. FIG. 6 is coupled to the device of FIG. 3. In the previous examples the P channel of the calling party connects to the Q channel of the called party by the device of FIG. 3 with an $(m+n)$ channel delay. These examples are merely one direction connection from the calling party to the called party. In these examples only the switch $S(m, n)$ as shown in FIG. 3 are used.

In accordance with a feature of the invention, the device of FIG. 6 makes connection from the called station to the calling station. In FIG. 6 a first delay line 6D1, comparable to delay line $D_1$ of FIG. 3, possesses output, intermediate or terminal taps at points corresponding to 24—20, 24—16, 24—12, 24—8, 24—4, and 24—0 channels from the Q channel of the called party. The signals from these taps pass to the four intermediate or terminal input taps of a second delay line 6D2 by way of one of 24 suitably chosen switches, S(—0, —0), S(—0, —4), etc., such as shown in FIG. 7.

The delay lines 6D1 and 6D2 which may be of the conventional kind correspond to the day lines $D_1$ and $D_2$ and operate similarly. The matrix of FIG. 6 comprises four horizontal $h$-rows corresponding to the taps 24–0, 24—1, 24—2 and 24—3 with each row representing a conductor. Six vertical $v$-row conductors corresponding to the above-mentioned taps are insulated from the $h$-rows and connect thereto by switch circuits S(—0, —0) etc. such as those shown in FIG. 7. These latter circuits allow current to pass from one $v$-row to one $h$-row in conformance to the coded signal applied to any one of the circuits at the intersections. In this manner the matrix of FIG. 6 corresponds almost precisely to the matrix of FIG. 3 with the exception that the delay first occurs through the horizontal delay line 6D1. In FIG. 6 a total of $(24-n)+(24-m)=48-(m+n)$ channel delay occurs to a signal from the Q channel. A $24-n$ channel delay is imparted by the delay line 6D1. After transfer by the switch $S(-m, -n)$, another $24-m$ channel delay is imparted to the signal by the second delay line 6D2. This Q channel of the "out line" from the called party is $m+n$ channels behind the P channel of the calling party. Therefore, the signal in the Q channel of the called party passes to the P channel of the calling party due to the aforesaid $48-(m+n)$ channel delay. As stated, the switch $S(m, n)$ in FIG. 3 corresponds to the switches $S(-m, -n)$ in FIG. 6. Switches $S(m, n)$ and $S(-m, -n)$ respectively connect onto the line from the calling and called parties. Preferably means are provided to control these switches to pass the signal at the same point of time. In fact, the output of the same memory controls the switches on the devices in FIGS. 3 and 6. Thus, according to a feature of this invention, the 24 switches of the channel rearranging device in FIG. 6 for connection from the Q channel of the called party to the calling party are controlled at the same instant as the 24 switches of the device in FIG. 3 for connection from the P channel of the calling party to the Q station of the called party.

To effect connection from the P channel calling party to the Q channel called party, the value $m$ enters in binary code in $G_1$ of the memory unit of FIG. 4 and the value $n$ enters in 2-out-of-4 code the units $G_2$ at the P channel of the calling party. At a time corresponding to $P+m$ channels an output occurs on the memory output lines having a code indicating $n$. The output controls the switch $S(m, n)$ in FIG. 3 and the switch $S(-m, -n)$ in FIG. 6 to thereby pass the respective signals.

If, for example, $Q-P=9$, then $m=1$, and $n=8$. The value 1 enters the delay $G_1$ in FIG. 4 at the P channel and at the same time the value 8 enters the $n$ group $G_2$ in FIG. 4. This latter entry comprises signals $I_{21}$ and $I_{22}$ only at delay lines $G_{2-1}$ and $G_{2-2}$. At the instant one channel after the P channel, namely the time corresponding to $P+1$ channels, the signal entered in $G_1$ enters the AND circuits, A10, A11, A12, A14 in the group No. 1. The coded entry in group $G_2$ passes from output tap 1 of these delay memories. That is, an output occurs only from the intermediate output tap 1 of delay lines $G_{2-1}$ and $G_{2-2}$ in $G_2$. As a result, only output lines 11 and 12 produce signals. Memory output lines 10, 11, 12 and 14 control the switches on the number 1 and 24—1 $h$-rows in FIGS. 3 and 6, respectively.

In the present example because signals pass only from lines 11 and 12, they both turn on the switch in the $h$-row designated 1 and (24—1) at the third $v$-row designated 8 and (24—8) in FIGS. 3 and 6, respectively. Thus switches $S(\mathbf{1}, \mathbf{8})$ and $S(-\mathbf{1}, -\mathbf{8})$ in FIGS. 3 and 6, respectively, pass the signals from delay lines $D_1$ to $D_2$ and 6D1 to 6D2, respectively. Thus, the P channel signal from the calling party passes switch $S(\mathbf{1}, \mathbf{8})$, bearing a one channel delay. This one channel delay is caused by the first delay line $D_1$ in FIG. 3. The signal reaches the receiving party after another 8 channel delay. The Q channel signal from the called party receives a 24—8 or 16 channel delay from the delay line 6D1 in FIG. 6. The signal passes switch $S(-\mathbf{1}, -\mathbf{8})$ at a time corresponding to $Q+(24-8)=P+9+24-8=P+24+1$ channels. This equals the time phase coresponding to $P+1$ channels. The signal then receives another (24—1) channel delay (i.e. a 23 channel delay) and passes to the P channel calling party with a total of $(24-8)+(24-1)=48-9$ channel delay. At a time corresponding to $$(P+9+48-9)$$

channels, that is, at a time phase corresponding to P channels, the signal is transmitted to the calling party. The P channel of the calling party and the Q channel of the called party connect in both directions by means of the circuits of FIGS. 3 and 6 on the basis of control by one single memory.

The switches in FIG. 3 and FIG. 6 are as shown, for example, in FIG. 3($a$). The two control terminals of $S(\mathbf{0}, \mathbf{0})$ in FIG. 3 and $S(\mathbf{0}, \mathbf{0})$ in FIG. 6 are connected with output lines 00 and 01 in FIG. 4; the two control terminals of $S(\mathbf{0}, \mathbf{4})$ and $S(\mathbf{0}, -\mathbf{4})$, with output lines 00 and 02 in FIG. 4; the two control terminals of $S(\mathbf{1}, \mathbf{8})$ and $S(-\mathbf{1}, -\mathbf{8})$, with output lines 11 and 12 in FIG. 4, and so forth. The two control terminals of $S(\mathbf{3}, \mathbf{20})$ and $S(-\mathbf{3}, -\mathbf{20})$ are connected with output lines 32 and 34 in FIG. 4.

Input terminals $I_{11}$, $I_{12}$ etc. in FIG. 4 are connected, for instance, with the caller to the exchange having this channel rearranging equipment, an connections of incoming and outgoing lines are made by this channel rearranging equipment. Control signals, therefore, pass to $G_1$ and $G_2$ from the callers through these terminals. The "line erase" is connected with the calling supervisory device of this exchange. When the conversation is over, a signal only for the channel occurs, and the contents of memory of this channel are erased. Such devices are well known, and are usual in electronic exchanges.

In general then, the invention operates as follows. When an automatic operator in a tandem station senses a calling signal on a P channel, it selects an unused Q channel to the called party. It then computes the channel difference and enters this difference into the memory of FIG. 4. The memory controls both delay devise of FIGS. 3 and 6. Each signal in the P and Q channels is then properly delayed.

Signals from calling parties on other channels are similarly connected with called parties on other channels and their channel differences enter the memory in FIG. 4. The latter operates with each successive channel for both calling and called parties.

In FIG. 7 the resistors passing from the vertical matrix lines to the horizontal lines may be diodes poled toward the horizontal lines.

FIG. 8 shows how the device embodying the features of the invention is used in an exchange network. In this figure, $Su\mathbf{1}$ is the calling subscriber; $Su\mathbf{2}$, the called subscriber; HB, the hybrid transformer; G, the time division gate; T, the transformer; M, the marker. Calling subscriber $Su\mathbf{1}$ is connected first with the register of tandem office A, and by dialing, the calling subscriber should be connected with subscriber $Su\mathbf{2}$ of tandem office C through tandem office B. The foregoing matter does not differ from other time division exchanges, so that portions are left out of the register and other parts.

In this way, this subscriber is connected with the channel rearranging equipment, which embodies the features of the invention, in tandem office A through one of the free channels in tandem office A.

In the junction between tandem offices A and B, the channel, which bears the same channel number as that used in tandem office A, is not necessarily free. The channel in tandem office A, therefore, is connected with an arbitrarily chosen free channel in this junction. Thus a rearrangement of channels is effected, with the calling subscriber being connected with this junction. Furthermore, communication between the markers of tandem office A and tandem office B transfers information from tandem office A to tandem office B. On the basis of this information, the channel which was used between tandem offices A and B is connected with the channel rearranging equipment. At this equipment, the said channel undergoes channel rearrangement in which it is connected with one of the free channels in the junction between tandem offices B and C.

Furthermore, communication between the markers of tandem offices B and C connects the channel with the channel rearranging equipment of tandem office C embodying the features of the invention. Then the channel is again rearranged into one which can be used for called subscriber S*u*2, and finally S*u*1 and S*u*2 are connected with each other.

Without channel rearranging equipment embodying the features of this invention, probability of blocking would be raised considerably because there would be only small probability of the existence of a channel which is free simultaneously in tandem office A, in the junction between tandem offices A and B, in tandem office B, in the junction between tandem offices B and C, and in tandem office C. Adoption of the channel rearranging equipment, which embodies the features of this invention, will make connection possible if only there are free channels, even though there is no channel that is free simultaneously in all of the aforesaid parts.

It will be obvious to those skilled in the art, upon a study of this disclosure, that our invention is amenable to a great variety of modifications and uses and hence may be embodied in devices and employed for purposes other than particularly set forth herein, without departing from the essential features of our invention and within the scope of the claims annexed hereto.

We claim:

1. In a time-division multiplex communication system, channel distributing equipment comprising first and second channel distributing systems each comprising first and second time delay devices each having a number of intermediate taps corresponding to respectively different delay intervals, said first time delay device having an input lead, said second time delay device having an output lead, a plurality of selectively operable switch means forming a single matrix, each tap on each time delay device being connected to a number of switch means corresponding to the number of taps on the other time delay device, each of said switch means being selectively operable to connect one tap on one time delay device with one tap on the other; memory means for storing information corresponding to the difference between the time position of each channel at the input lead of the first time delay device of each of said first and second channel distributing systems and the time position to be occupied at the output lead of the second time delay device of each of said first and second channel distributing systems, and connecting means connecting said memory means with the switch means of said first and second channel distributing systems for simultaneously controlling the said switch means in dependence upon said intelligence stored in said memory means for simultaneous transmission from the input lead of one of said first and second channel distributing systems to the output lead of the other of said first and second channel distributing systems and from the input lead of the other of said first and second channel distributing systems to the output lead of the one of said first and second channel distributing systems.

2. A communication system as claimed in claim 1, wherein the first time delay device of each of said first and second channel distributing systems is subdivided by the taps into equal time delay stages, the second time delay device of each of said first and second channel distributing systems is subdivided by the taps into equal time delay stages differing from those of the first time delay device, and both time delay stages of each of said first and second channel distributing systems supplement each other to provide any number of channel delays up to the total number of time-division channels.

3. An $x$ channel multiplex communication channel distributing link for rearranging the channel position of signals from an incoming line in a first time channel to a second time channel in an outgoing line and from the second time channel in said outgoing line to the first time channel in said incoming line, where the first and second channels are separated by a predetermined number of $m+n$ channels, said channel distributing link comprising first time delay means for delaying the signals from the first channel by a period $m+n$ channels to pass signals in the first channel from the incoming line to the second channel in the outgoing line; second time delay means for delaying signals from the outgoing line to the incoming line by a complementary $x-(m+n)$ channels, each of said first and second delay means having a plurality of switch means forming together a single matrix; and memory means connected to the switch means of said first and second time delay means for controlling the time delay in each of said first and second time delay means for simultaneous transmission from the incoming line to the outgoing line and from the outgoing line to the incoming line.

4. An $x$ channel multiplex communication channel distributing link for rearranging the channel position of simultaneously operative signals from an incoming line in a first time channel to a second time channel in an outgoing line without mutual interference, where the first and second channels are separated by a predetermined number of $m+n$ channels, said channel distributing link comprising first time delay means for delaying the signals by a period of $m+n$ channels to pass signals in the first channel from the incoming line to the second channel in the outgoing line; second time delay means for delaying signals from the second channel in the outgoing line by a complementary $x-(m+n)$ channels, each of said first and second time delay means including two time delay devices having $m$ and $n$ taps respectively, where each of $m$ and $n$ is a whole number establishing a difference of order in the delay between the taps of one and the other time delay device, each of said first and second time delay means having a plurality of switch means forming a matrix, each tap on each time delay device of each of said first and second time delay means being connected to a number of switch means corresponding to the number of taps on the other time delay device, each of said switch means being selectively operable to connect one tap on one time delay device to one tap on the other time delay device of each of said first and second time delay means for switching the incoming signal from one time delay device to the other time delay device after a selected delay time in the first time delay device for another selected delay time in the other time delay device; and memory means connected to the switch means of each of the first and second time delay means for operating the switch means of said first and second delay means at respective times $m$ channels and $x-m$ channels after signal input from the first channel and the second channel respectively, and for causing a delay of $n$ and $x-n$ channels in the other respective delay device of the first and second time delay means respectively for simultaneous transmission from the incoming line to the outgoing line and from the outgoing line to the incoming line.

References Cited by the Examiner

UNITED STATES PATENTS

| | | | |
|---|---|---|---|
| 2,584,987 | 2/1952 | Deloraine | 179—15 |
| 2,807,002 | 9/1957 | Cherin | 333—29 X |
| 2,917,583 | 12/1959 | Burton et al. | 179—15 |
| 3,049,593 | 8/1962 | Touraton et al. | 179—15 |

DAVID G. REDINBAUGH, *Primary Examiner.*

ROBERT H. ROSE, *Examiner.*

ROBERT L. GRIFFIN, STEVEN J. GLASSMAN, *Assistant Examiners.*